UNITED STATES PATENT OFFICE.

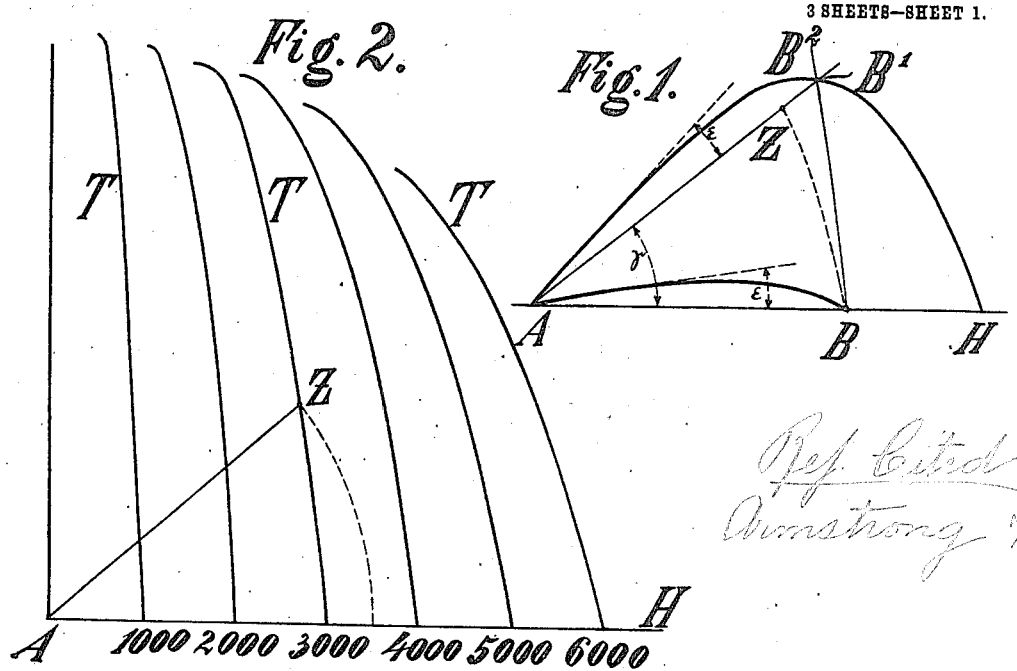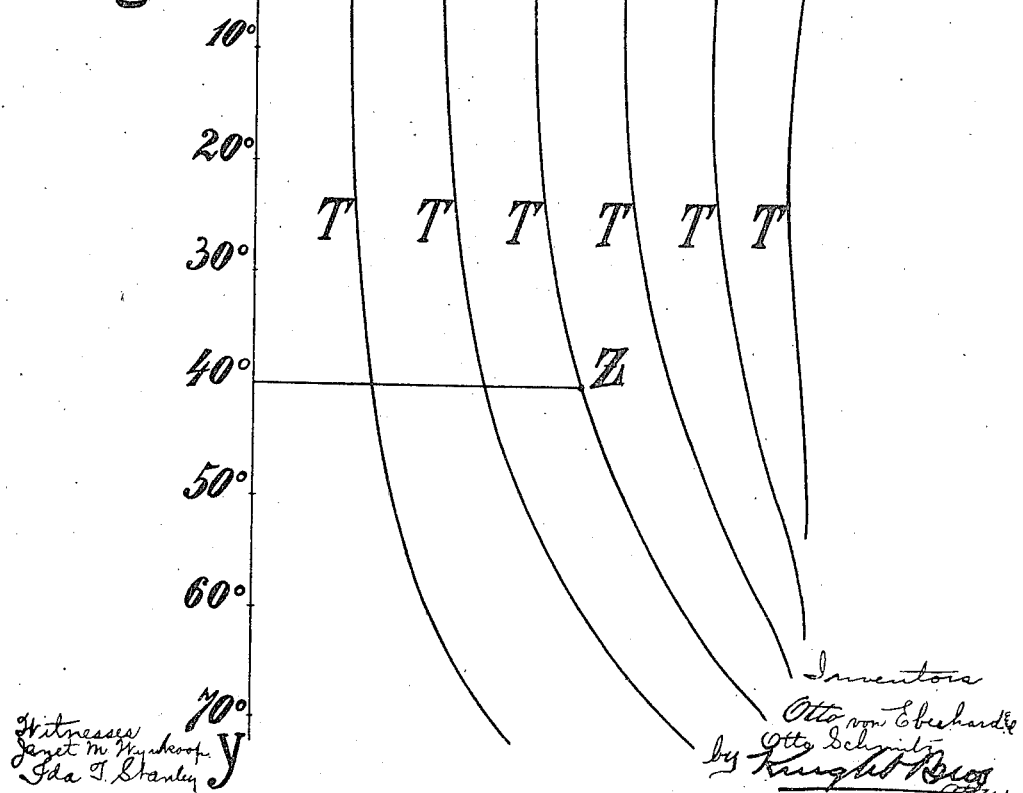

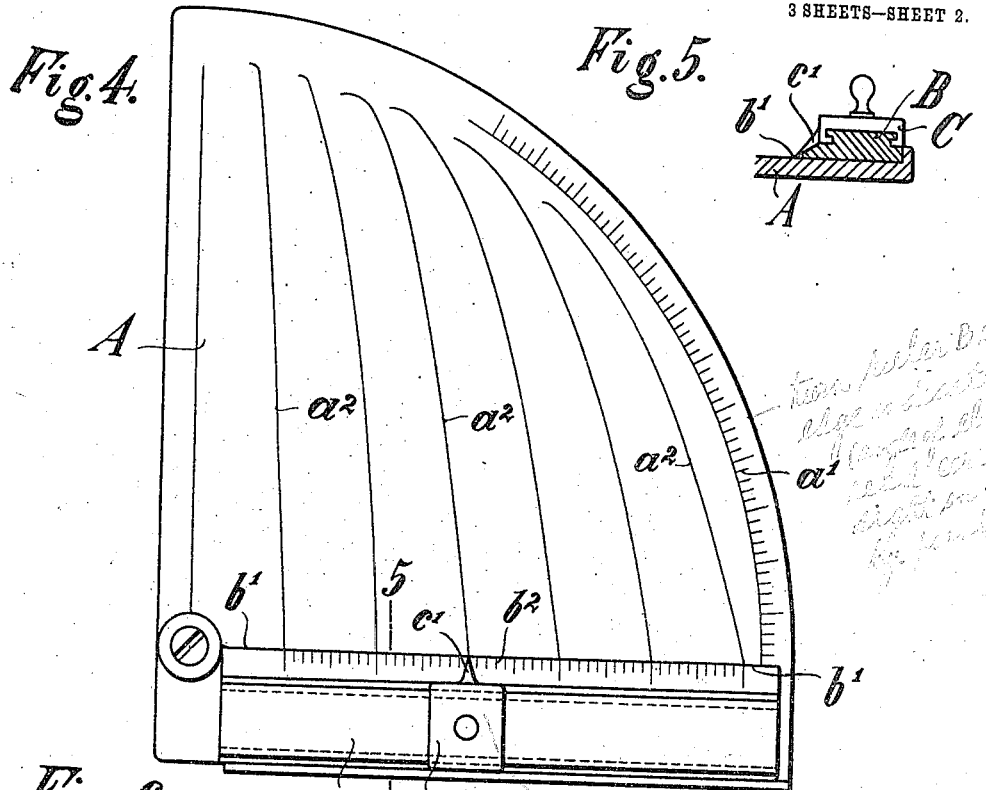
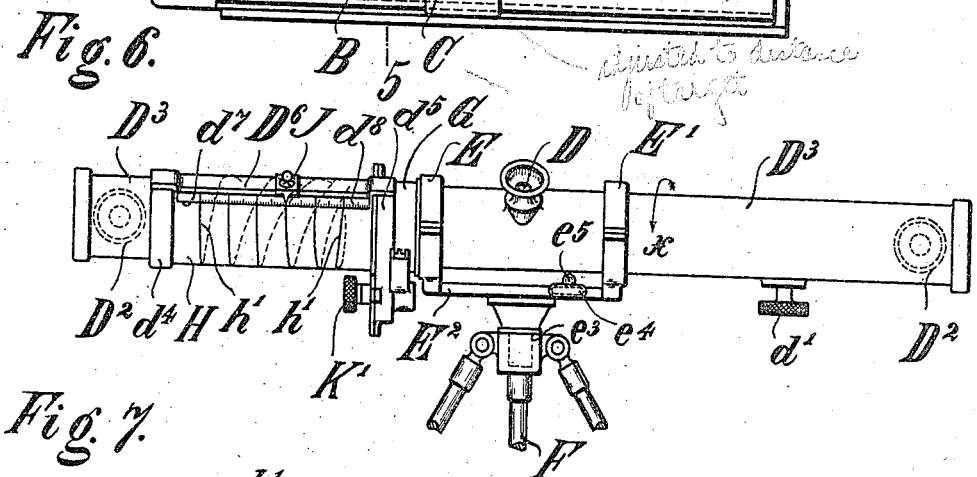
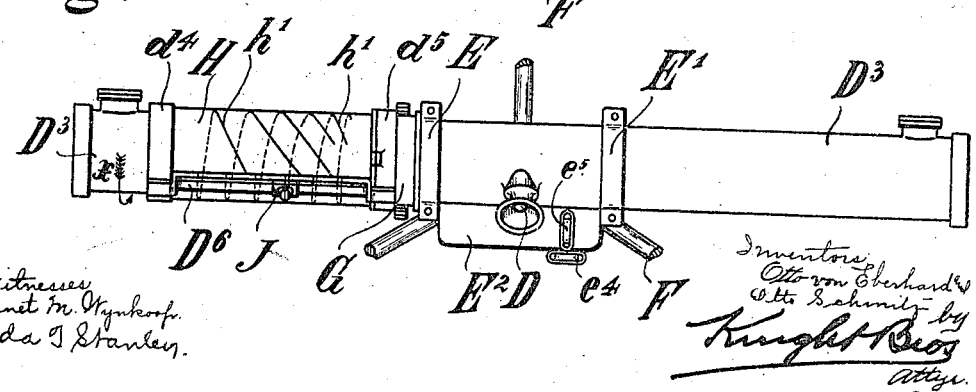

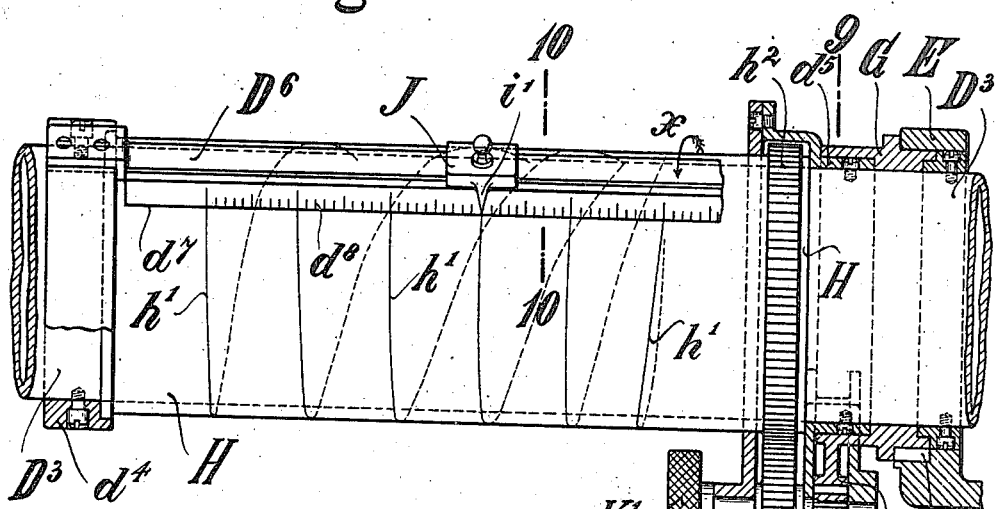
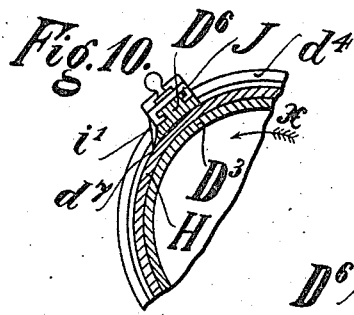
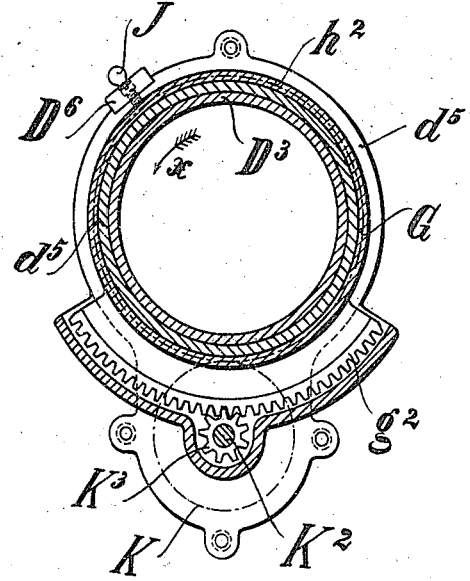

OTTO VON EBERHARD, OF BREDENEY-ON-THE-RUHR, AND OTTO SCHMITZ, OF ESSEN-ON-THE-RUHR, GERMANY, ASSIGNORS TO FRIED. KRUPP AKTIENGESELLSCHAFT, OF ESSEN-ON-THE-RUHR, GERMANY.

DEVICE FOR DETERMINING SIGHT ADJUSTMENTS.

949,015.      Specification of Letters Patent.      Patented Feb. 15, 1910.

Application filed May 13, 1908, Serial No. 432,723. Renewed November 26, 1909. Serial No. 530,007.

*To all whom it may concern:*

Be it known that we, OTTO RITTER VON EBERHARD, residing at Bredeney-on-the-Ruhr, Germany, and OTTO SCHMITZ, residing at Essen-on-the-Ruhr, Germany, both subjects of the Emperor of Germany, have invented a certain new and useful Improvement in Devices for Determining Sight Adjustments, of which the following is a specification.

The present invention relates to a device for determining sight-adjustments which are to be used for firing at targets which are located outside of the muzzle-horizon, that is outside of the horizontal plane passing through the center of the muzzle of the fire-arm.

As commonly known the distance-scales of sights for fire-arms, in particular sight-attachments for guns, are absolutely correct only for those targets which are located in the muzzle-horizon and they indicate the ranges with reference to the muzzle-horizon, that is the so-called horizontal ranges. The distance-scales relating to the muzzle-horizon approximately apply, when small elevations are used, also to such targets as are located only a small distance above or below the muzzle-horizon, that is, targets with very small corresponding terrain-angle. If, however, targets are fired at which appear under a very great terrain angle, such as is almost always the case with air-ships, considerable error will arise when the sight-device is adjusted to the distance which the target really has. In order to hit the target in this instance, it is necessary to adjust the sight-device to a range which generally deviates considerably from the real distance of the target.

The object of the present invention is to provide a device on which can be read the adjustment which must be imparted to the sight-device in such instances.

In the accompanying drawings, Figures 1 to 3 are geometric illustrations which serve to explain the idea on which the invention is based; Fig. 4 is a side view of one embodiment of the invention; Fig. 5 is a section on line 5—5, Fig. 4, looking from the left; Fig. 6 is a side view of another embodiment of the invention; Fig. 7 is a top view of Fig. 6; Fig. 8 shows a part of Fig. 6, on an enlarged scale, and partly in section; Fig. 9 is a section on line 9—9, Fig. 8, looking from the right, and Fig. 10 is a section on line 10—10, Fig. 8, looking from the right.

The theoretic foundation of the invention will first be explained in connection with a gun having a sight-attachment.

In Fig. 1 the center of the muzzle of the gun is designated A and A H indicates the muzzle-horizon. Let the sight-attachment of the gun be adjusted in such a manner that the firing angle, which is the angle between the sighting line and the axis of the bore of the gun-barrel, is equal to $\epsilon$. Let B indicate the point in which the path of flight (trajectory) of a projectile intersects the muzzle-horizon A H when the gun is directed at a target located in the muzzle-horizon and when the sight-attachment is in the aforesaid position. The line A B indicates the horizontal range which corresponds to the firing angle $\epsilon$ and which, when the sight-attachment is in the aforesaid position, is indicated on the distance-scale of the attachment. The position of the sight-attachment can, therefore, be assumed to be determined by the horizontal range A B instead of by the corresponding firing angle $\epsilon$. Z indicates a target, for instance an air-ship, which is located far above the muzzle horizon and which has its distance A Z equal to the horizontal range A B corresponding to the firing angle $\epsilon$ and $\gamma$ indicates the terrain-angle Z A H at which the target Z appears. If the gun is directed at the target Z, with the same position of the sight-attachment, the path of flight intersects the firing line A Z in a point $B^1$ which, although the attachment is adjusted to a range equal to the distance A Z of the target, does not generally coincide with Z. $B^1$ indicates the striking point corresponding to the terrain angle $\gamma$ and A $B^1$ indicates the corresponding range. Let it be assumed that we have obtained the striking points for any possible value of $\gamma$ when the sight-attachment is in the position determined by the horizontal range A B. If the striking points are then connected by a curve we obtain the curve B $B^1$ $B^2$ which in the following will be termed the striking point curve. *In vacuo* the striking point curve is, as commonly known, a parabola, the axis of which bisects the horizontal range corresponding to the striking point curve and is perpendicular thereto. In the airfilled space a curve is obtained which extends substantially like a parabola. If it be assumed that the striking point curve is laid off in a polar coördinate system, which has its pole located in A and which has its polar axis coinciding with the muzzle-horizon A H, the polar angle of any point of the striking point curve indicates the terrain angle and the radius vector indicates the range. The striking point curve corresponding to a predetermined horizontal range is, therefore, the graphic illustration on a polar coördinate system of the relations which exist between the terrain angle and the appurtenant range when the sight-attachment is in the position determined by the given horizontal range.

For each horizontal range there is a different striking point curve. In Fig. 2 are indicated the striking point curves corresponding to the horizontal ranges of 1000 to 6000 meters, which are spaced 1000 meters apart. By means of these curves, which are designated T in the drawings, the vertical range is divided into zones which can be used for determining the position of the sight-attachment required for a given target. To that end it is merely necessary to mark the position of the target in the figure. Let it be assumed that, in Fig. 2, Z designates the point which indicates the position of the target. If, as is assumed in the drawings, this point is located in one of the striking point curves T, for instance in the curve corresponding to the horizontal range of 3000 meters, the sight-attachment must be adjusted to the horizontal range corresponding to the respective curve, that is to say in the present instance to the range of 3000 meters although the real distance of the target according to the drawing is about 3500 meters. If the point Z falls in the space between the two adjacent curves T the required position of the attachment can easily be estimated. The greater the number of attachment-positions selected for which striking point curves are constructed the narrower are the single zones and the greater will be the accuracy with which the positions can be read.

In Fig. 2 polar coördinates are used for the graphic illustration of the position of the target Z and for illustration of the relations between the terrain-angles and the range. It is apparent that any other kind of graphic illustration can be used just as well. The curves thus obtained will in the following also be termed striking point curves.

In Fig. 3 the same conditions as in Fig. 2 are shown graphically by means of a rectangular coördinate-system. The abscissa-axis of the coördinate-system is designated A X and the ordinate-axis is designated A Y. In this mode of illustration the terrain-angles are laid off on a suitable scale as ordinates and the corresponding ranges are laid off as abscissæ. When showing the position of the target Z the terrain-angle of the target must therefore be laid off as ordinate and the distance of the target must be laid off as abscissa. The striking point curves T, which are obtained by this kind of graphic illustration, have of course a form which is different from that of the corresponding curves of Fig. 2.

By using cylinder-coördinates we obtain another very suitable graphic illustration of the conditions. When this mode of illustration is used the terrain-angles are, on a suitable scale, laid off on the periphery of a circle, then perpendiculars to the plane of the circle are erected in the division-points, then the ranges corresponding to the terrain-angles are laid off on the perpendiculars, and finally the points thus obtained are connected by curves. All of these curves, which correspond to the striking point curves T of Figs. 2 and 3, lie on a cylindrical surface the diameter of which is equal to the diameter of the circle on whose periphery the terrain-angles are laid off. By using this mode of illustration we obtain the delineation shown in Fig. 8, in which the curves $h^1$, which lie on the outer surface of a cylindrical drum H, illustrate the striking point curves. If it be assumed that the cylindrical surface, on which the striking point curves lie, is divided along the side-line which corresponds to the terrain-angle 0° and then developed into a plane we obtain the same delineation as in Fig. 3.

The first embodiment of the invention is shown in Figs. 4 and 5. An adjustable member or ruler B having an edge $b^1$ is rotatably mounted on a plate A which has substantially the shape of a sector of approximately 90°. The edge $b^1$, which intersects the axis of rotation of the ruler B, can be adjusted along a terrain-scale $a^1$ provided on the edge of the plate A concentric with the axis of rotation of the ruler B. On the surface of the plate A traversed by the edge $b^1$ of the ruler are drawn, in a manner similar to Fig. 2, a plurality of striking point curves $a^2$ appertaining to a great number of different positions of the sight-attachment. For the sake of clearness, only a few of these curves are shown in the drawings. The pole of the polar coördinate-system, which forms the foundation for this illustration, coincides with the point of intersection between the edge $b^1$ of the ruler and the axis of rotation of the ruler B, and the polar-axis coincides with the connection-line between this point of intersection and the zero-point of the scale $a^1$ for the terrain-angles. The positions of the sight-attachment, which correspond to the several striking point curves $a^2$ are shown by a chart, suitably located, the corresponding horizontal ranges preferably being indicated. A scale $b^2$, which indicates the distance of the targets, is provided on the ruler B along the edge $b^1$, the unit of measurement of the scale being the same as that used for the curves $a^2$ indicating the ranges. The zero-point of the scale $b^2$ coincides with the point of intersection of the edge $b^1$ and the axis of rotation of the ruler. To adjust the distances of the target serves an index-hand $c^1$ which is secured on a slide C which is guided on the ruler B parallel to the edge $b^1$.

In order to obtain, by means of the above-described device, the position of the sight-attachment which is required for hitting a target that is given by means of its position, we proceed in the following manner: The index-hand $c^1$ of the slide C is first adjusted to the point of the scale $b^2$ which corresponds to the distance of the target. The ruler B is thereupon turned until the edge $b^1$ registers with the point of the scale $a^1$ which corresponds to the terrain-angle of the target. The operator then looks for the curve $a^2$ which lies nearest the point of the edge $b^1$ with which the index-hand $c^1$ registers. If the point in question falls exactly in one of the curves $a^2$ the required position of the sight-attachment can be directly read; if the point lies between two adjacent curves $a^2$ the required position of the sight-attachment can be estimated with sufficient accuracy.

Figs. 6 to 10 show the second embodiment of the invention in combination with a range finder. The range finder is of known construction and consists of two telescopes having a common eye-piece D and an adjusting device which is to be operated by means of a hand-wheel $d^1$ (Fig. 6) and by means of which the images produced by the two objectives $D^2$ (Fig. 6) can be displaced relatively to one another in such a manner that they appear in the same place in the field of the eye-piece. The amount of displacement necessary to accomplish this end serves as a measure for the distance of the object sighted at and can be read on a scale (not shown in the drawings). The housing $D^3$ of the range finder rests in two bearings E $E^1$ each of which consists of two parts and which are connected with each other by a plate $E^2$ carried by the frame F. The housing $D^3$ is capable of rotation in its bearings about its longitudinal axis. A bushing G is rotatably and non-slidably mounted on the housing $D^3$. When the range finder is placed in its bearings E $E^1$ the bushing G is non-rotatably connected with the bearing E through the medium of a spline $g^1$ (Fig. 8) for which a corresponding groove is provided in the bearing E. The housing $D^3$ is surrounded by a cylindrical drum H which can turn about the longitudinal axis of the drum and which has its ends abutting against two rings $d^4$ and $d^5$ which are rigidly secured on the housing. On the cylindrical surface of the drum are inscribed a plurality of striking point curves $h^1$ appertaining to a great number of different positions of the sight-attachment, the curves being inscribed in the manner described in connection with the cylinder coördinate system. For the sake of clearness only a few of these curves are shown in the drawings. The positions of the sight-attachments, which correspond to the several striking point curves $h^1$, are shown by a chart suitably located, the corresponding horizontal ranges preferably being indicated. To the rings $d^4$ and $d^5$ is rigidly secured a ruler $D^6$ having an edge $d^7$. Along the edge $d^7$, which extends parallel to the axis of rotation of the drum H and lies directly above the cylindrical surface of the drum, is provided a scale $d^8$ which indicates the target distances, the unit of measurement of the scale $d^8$ being the same as that used in inscribing the curves $h^1$ indicating the ranges. The zero-point of the scale $d^8$ lies in the cross-sectional plane of the drum H which corresponds to a range of zero. An index-hand $i^1$ (Fig. 8), which is arranged on a slide J guided on the ruler $D^6$ parallel to the edge $d^7$, serves for the adjustment of the distances of the target. The drum H is provided with a circular rack $h^2$ (Fig. 8) which meshes with a gear-wheel K which is journaled in a projection on the ring $d^5$. The gear-wheel K can be rotated by means of a hand-wheel $K^1$, and by means of a shaft $K^2$ the wheel K is rigidly connected with a pinion $K^3$ which meshes with a toothed sector $g^2$ arranged on the bushing G. As the bushing G is non-rotatably connected with the bearing E the pinion $K^3$ must revolve along the toothed sector $g^2$ when the hand-wheel $K^1$ is rotated. The housing $D^3$ of the range finder together with the shaft $K^2$ is thereby caused to rotate in its bearings E $E^1$ about its longitudinal axis; at the same time the rotation of the pinion $K^3$ about the axis of its shaft $K^2$ is transmitted to the drum H through the medium of the toothed gearing K $h^2$. The toothed gearings $g^2$ $K^3$ and K $h^2$ consequently constitute a planetary gear. The dimensions of the planetary gear are selected in such a manner that, when the housing $D^3$ of the range finder turns together with the rings $d^4$ $d^5$ and the ruler $D^6$ in the direction of the arrow $x$, the drum H turns in the opposite direction. The ratio of transmission is selected in such a manner that, if the edge $d^7$ of the ruler at the commencement of the turning movement of the housing $D^3$ coincides with the side-line of the drum H corresponding to a terrain-angle of zero degrees, the edge $d^7$ will, at the end of the turning movement, coincide with a side-line which corresponds to a terrain-angle which is equal to the angle of turning of the housing $D^3$. By means of a trunnion $e^3$ (Fig. 6) the plate $E^2$, which connects the bearings E $E^1$, is rotatably mounted in the frame F in such a manner that it is possible to direct the sighting line of the range finder on every point of the field of view. By means of a set-screw (not shown in the drawings) the plate $E^2$ can be secured in any angular position. Furthermore, suitable adjustable devices (likewise not shown) are provided by means of which any desired inclination relatively to the horizontal can be imparted to the plate $E^2$. On the plate $E^2$ are provided two levels $e^4$ and $e^5$ and by suitable adjustment of the plate $E^2$ the air-bubbles of the levels can be caused to register. When the bubbles register the axis of rotation of the housing $D^3$ is horizontal and if at the same time the edge $d^7$ of the ruler coincides with the side-line of the drum H which corresponds to a terrain-angle of zero degrees the sighting line of the range finder is also horizontal.

In order to obtain, by means of the device just described, the position of the sight-attachment which is required for firing at targets located at very high elevations, we proceed in the following manner: The plate $E^2$ is first adjusted in such a manner that the bubbles of the levels $e^4$ and $e^5$ register. To simplify matters it will be assumed that the edge $d^7$ of the ruler is located over the side-line of the drum H which corresponds to a terrain-angle of zero degrees and, when the bubbles register, the sighting line of the range finder will, therefore, be horizontal. The sighting line of the range finder is thereupon directed at the target, for which purpose the hand-wheel $K^1$ is turned to swing the housing $D^3$ about its longitudinal axis and simultaneously therewith the required lateral direction is imparted to the housing $D^3$ by turning the plate $E^2$ about the axis of the trunnion $e^3$. The housing $D^3$ will then have turned about its longitudinal axis in the direction of the arrow $x$, the angle being equal to the terrain-angle of the target, while the drum H will have turned in the direction opposite to that of the arrow $x$ to such an extent that the edge $d^7$ of the ruler registers with that side-line of the drum which corresponds to the terrain-angle of the target. After the sighting-line has been directed at the target the hand-wheel $d^1$ is turned until both images of the target appear at the same place in the field of view of the eye-piece. Thereupon the distance of the target is read off and the slide J is adjusted on the ruler $D^6$ in such a manner that the index-hand $i^1$ registers with that point on the scale $d^8$ which corresponds to the distance read off. If the point of the drum H shown by the index-hand $i^1$ lies in one of the curves $h^1$ the required position of the sight-attachment can be directly read off, and if it lies between two adjacent curves $h^1$ the position of the sight-attachment can be estimated with sufficient accuracy.

Instead of being combined with a range finder the device forming the subject-matter of the invention may of course be combined with any other sight-device in such a manner that, when the sight-device is directed at the target, the terrain-angle of the target is automatically transferred to the surface containing the striking point curves.

Having thus described the invention, what is claimed and desired to be secured by Letters Patent is:

1. A device for determining adjustments of sight devices, comprising a telescope having striking point curves for a plurality of different ranges illustrated thereon; and an indicator member slidably mounted on said telescope to automatically register the relations between the striking point and the terrain angle for any desired range.

2. The combination with a telescope provided with curves thereon, each of said curves illustrating the striking points corresponding to a given range for different terrain-angles; of a member slidable longitudinally along said telescope and adapted to register the relation between the striking point and the terrain-angle for any required range.

3. The combination with a range finder; of a device for determining adjustments of the gun-sight, said device comprising a graphical diagram inscribed upon the barrel of said range-finder to illustrate the relations between range and terrain-angle for different adjustments of the gun sight; and a member movable on the barrel of said range finder and adapted to register the relation between the range and terrain-angle.

4. The combination with a range finder, of a device for determining adjustments of a gun-sight for use in firing at targets outside of the muzzle-horizon, comprising a member having a surface on which is graphically illustrated by curves the relations between terrain-angle and range for a plurality of different adjustments of the gun-sight, and a connection between the range finder and said device whereby the terrain-angle is automatically transferred to the surface containing the curves when the range finder is adjusted to the target.

5. The combination with a range-finder; of a device for determining adjustments of a gun sight outside the muzzle-horizon, said device comprising a surface provided with marks to indicate the angles at which a gun-sight may be set with reference to the muzzle-horizon, curves for determining the striking points for different ranges, and an adjustable member for indicating on said striking-point curves, the distances between the gun and the target.

6. The combination with a graphical diagram provided with a series of lines each of said lines illustrating for a given range, the striking points for different terrain-angles; and a movable member adapted to register the relation between the striking point and the terrain-angle for any desired range.

7. In a device for determining adjustments of gun-sights, the combination with a graphical diagram provided between a series of lines illustrating the relations existing between the firing angle, the terrain-angle and the range appertaining to said angles, each of said lines corresponding to a constant value of one of said three quantities and the coördinates of each line representing the two other quantities; of a ruler movable over said graphical diagram and adapted to indicate the coördinates of said lines.

8. In a sighting device comprising means for imparting to the sighting-line any desired inclination relatively to a plane fixed on the sighting device and means for adjusting said plane horizontally, the combination with a graphical diagram provided with a series of lines illustrating the relations existing between the firing angle, the terrain-angle and the range appertaining to said angles, the coördinates of each line representing the terrain-angle and one of the two other of said quantities and the third quantity being constant for a single line; of a ruler movable over said diagram and adapted to indicate the coördinates of said lines and means establishing positive connection between the ruler and said means for imparting to the sighting line any desired inclination relatively to said horizontally adjustable plane, said connecting means being adapted to move the ruler in such a manner, that it indicates in each position a coördinate representing a terrain-angle equal to the angle of inclination imparted to the sighting line relatively to said horizontally adjustable plane.

9. In a range finder provided with a sighting line and comprising means for imparting to the sighting line any desired inclination relatively to a plane fixed on the range finder and means for adjusting said plane horizontally, the combination with a graphical diagram provided with a series of lines, illustrating the relations existing between the firing angle, the terrain-angle and the range appertaining to said angles, the coördinates of each line representing the terrain-angle and one of the two other of said quantities and the third quantity being constant for a single line; of a ruler movable over said diagram and adapted to indicate the coördinates of said lines and means establishing positive connection between the ruler and said means for imparting to the sighting line any desired inclination relatively to said horizontally adjustable plane, said connecting means being adapted to move the ruler in such a manner, that it indicates in each position a coördinate representing a terrain-angle equal to the angle of inclination imparted to the sighting line relatively to said horizontally adjustable plane.

The foregoing specification signed at Dusseldorf, Germany, this 29 day of April, 1908.

OTTO VON EBERHARD.
OTTO SCHMITZ.

In presence of—
PETER LIEBER,
WILHELM FLASCHE.